United States Patent [19]

Kiyo-Oka

[11] Patent Number: 4,782,262
[45] Date of Patent: Nov. 1, 1988

[54] ROTARY ACTUATOR

[75] Inventor: Hiroshi Kiyo-Oka, Kiyose, Japan

[73] Assignee: Canon Kabushiki Kaisha, Tokyo, Japan

[21] Appl. No.: 56,663

[22] Filed: Jun. 2, 1987

[30] Foreign Application Priority Data

Jun. 11, 1986 [JP] Japan .................. 61-136777

[51] Int. Cl.$^4$ .................................... H01L 41/08
[52] U.S. Cl. ...................... 310/323; 310/328; 310/316; 310/317
[58] Field of Search ............... 310/323, 328, 317, 316

[56] References Cited

FOREIGN PATENT DOCUMENTS

| 0229680 | 11/1985 | Japan | 310/328 |
| 0573829 | 9/1977 | U.S.S.R. | 310/328 |
| 0620003 | 8/1978 | U.S.S.R. | 310/328 |
| 0619986 | 8/1978 | U.S.S.R. | 310/328 |
| 0668033 | 6/1979 | U.S.S.R. | 310/328 |
| 0744792 | 7/1980 | U.S.S.R. | 310/323 |

Primary Examiner—Mark O. Budd
Attorney, Agent, or Firm—Fitzpatrick, Cella, Harper & Scinto

[57] ABSTRACT

A rotary actuator has a rotary member eccentrically arranged, a plurality of electromechanical conversion elements arranged around the rotary member at equal angular intervals, and the electromechanical conversion elements driven to rotate the rotary member.

6 Claims, 9 Drawing Sheets

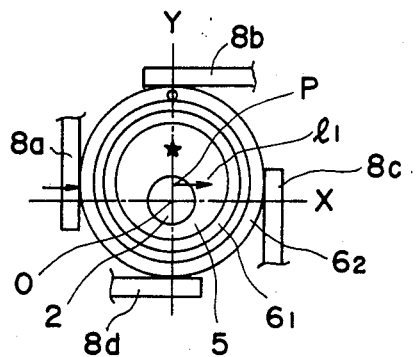
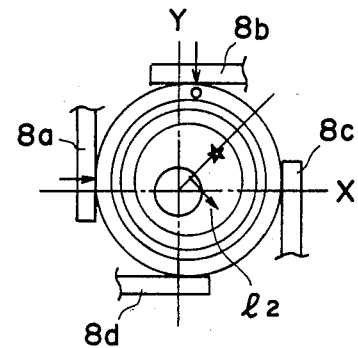
FIG. 5A  FIG. 5B
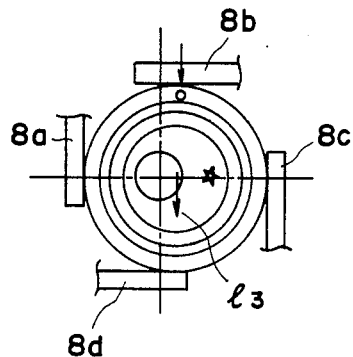
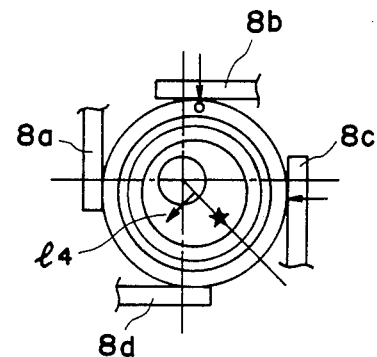
FIG. 5C  FIG. 5D
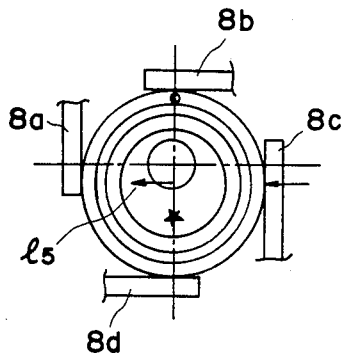
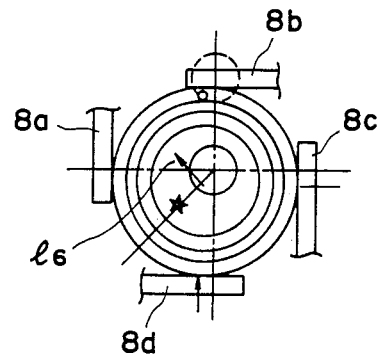
FIG. 5E  FIG. 5F

ROTARY ACTUATOR

BACKGROUND OF THE INVENTION

1. Field of the Invention

The present invention relates to a rotary actuator which performs rotary driving of a rotation member using an electromechanical conversion element such as a piezoelectric element.

2. Related Background Art

Conventionally, as a rotary actuator, an electromagnetic motor which uses a combination of a magnet and a coil is popular. Recently, a vibration wave motor which is driven by a traveling vibration wave is known. The vibration wave motor converts a vibration caused upon application of a frequency voltage to an electrostrictive element into rotation or linear motion, as disclosed in Japanese Patent Disclosure (Kokai) No. 29192/1976. Since the vibration wave motor does not require a coil unlike a conventional electromagnetic motor, its structure is simple and compact. During a low-speed rotation state, high torque can be obtained, and its inertial moment is small. Thus, the vibration wave motor has received a great deal of attention.

However, when the conventional vibration wave motor converts the vibration into the rotation or the like, it frictionally drives a moving member such as a rotor which is brought into contact with a vibration member in one direction by a standing vibration wave genreated by the vibration member. Upon forward vibration, the vibration member is in frictional contact with the moving member, and they are separated from each other upon reverse vibration. For this reason, the vibration member and the moving member must have a structure wherein they can be in contact with each other within a very small range, i.e., they can be in point or line contact with each other. Therefore, frictional driving efficiency is considerably degraded. Since the vibration is inertial motion, it is difficult to control it, and to obtain a desired operation.

SUMMARY OF THE INVENTION

It is an object of the present invention to provide a new and improved rotary actuator which is free from the above drawbacks and has a simple structure, and in which a rotary member is eccentrically arranged, a plurality of electromechanical conversion elements are arranged around the rotary member at equal angular intervals, and the electrochemical conversion elements are driven to rotate the rotary member.

It is another object of the present invention to provide a rotary actuator which comprises a sensor for detecting an angle of a rotary member and controls a deviation of an electromechanical conversion member based on the detection result from the sensor.

The above and other objects of the present invention will be apparent from the following description of preferred embodiments of the invention.

BRIEF DESCRIPTION OF THE DRAWINGS

FIGS. 5A to 5F are views showing the operation of the actuator shown in FIG. 1;

DETAILED DESCRIPTION OF THE PREFERRED EMBODIMENTS

Embodiments of the present invention will now be described with reference to the accompanying drawings. A first embodiment will first be described below.

Figure 1:
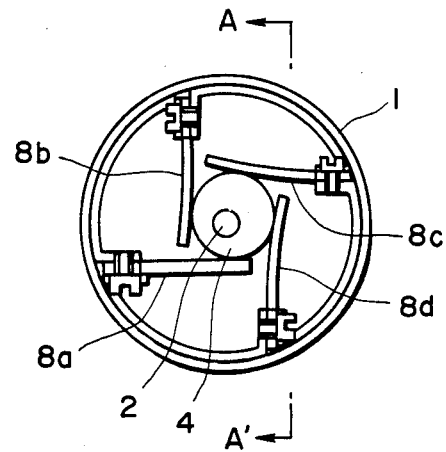
FIG. 1 is a view showing the structure of a rotary actuator according to a first embodiment of the present invention.
Figure 2:
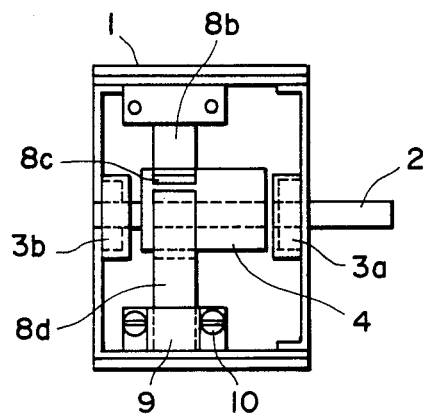
FIG. 2 is a sectional view taken along a line A-A' in FIG. 1.
Figure 3:
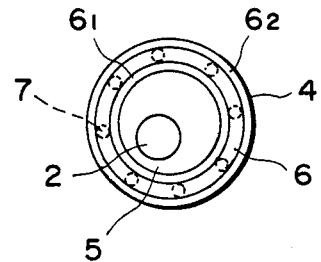
FIG. 3 is a view showing in detail an eccentric cam shown in FIG. 1.

FIGS. 1 and 2 show a rotary actuator as a whole. The rotary actuator is constituted by a hollow cylindrical housing 1, a rotation shaft 2 which is rotatably supported by bearings 3a and 3b fixed to the housing 1, and an eccentric cam 4 as a rotary member through which the rotation shaft 2 extends under pressure. The eccentric cam 4 comprises inner and outer cylinders 5 and 6, as shown in FIG. 3. The rotation shaft 2 is eccentrically fixed to the inner cylinder 5. The outer cylinder 6 comprises inner and outer rings $6_1$ and $6_2$ through ball bearings 7. The inner ring $6_1$ is fixed to the inner cylinder 5. The inner and outer rings $6_1$ and $6_2$ are operated through the ball bearings, and their operations will be described later. Piezoelectric elements 8a, 8b, 8c, and 8d abut against the eccentric cam 4 at their distal end portions. The end portions of the piezoelectric elements 8a, 8b, 8c, and 8d are fixed to the housing 1 by metal members 9 and screws 10 to be shifted from each other by 90°. These piezoelectric elements 8a, 8b, 8c, and 8d are bimorph type piezoelectric elements which are flexibly deformed like leaf springs.

Figure 4:
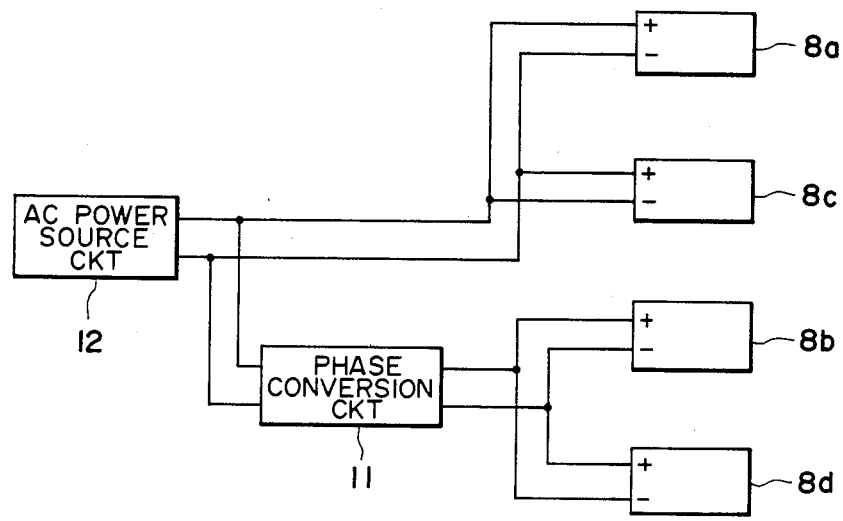
FIG. 4 is a block diagram of the actuator shown in FIG. 1.

FIG. 4 is a block diagram of a motor shown in FIGS. 1 and 2. The circuit shown in FIG. 4 includes the piezoelectric elements 8a, 8b, 8c, and 8d, a phase conversion circuit 11 for delaying phase by 90°, and an AC power source circuit 12. The circuit 12 can be a power source circuit for transforming a commercial power source or can be an AC oscillation circuit. That is, the circuit 12 can apply to the piezoelectric elements 8a, 8b, 8c, and 8d a 90° phase-shifted AC voltage with which a deviation twice an eccentricity of the eccentric cam 4 can be obtained by deformation of the elements 8a, 8b, 8c, and 8d.

The operation of the above arrangement will now be described with reference to FIGS. 5A to 5A. In FIGS. 5A to 5F, 0 indicates the center of the rotation shaft 2 and p indicates the center of the inner cylinder 5 of the eccentric cam 4. l indicates a rotation direction of the eccemtric cam 4, and mark ✰ is a mark for the sake of explanation and indicates the eccentric direction of the eccentric cam 4, and mark O indicates the movement of the outer ring of the outer cylinder 6 of the cam 4. Note that the marks ✰ and O are not actually present.

In the state of FIG. 5A, when an AC voltage is applied to the piezoelectric elements 8a, 8b, 8c, and 8d form the AC power source circuit 12, voltages of opposite polarities are applied to the piezoelectric elements 8a and 8c at an instance of voltage application, and a zero voltage is applied to the piezoelectric elements 8b and 8d since the voltage is 90° phase-shifted. Therefore, the piezoelectric element 8a is extended, the piezoelectric element 8c is flexed, and the piezoelectric elements 8b and 8d are not changed. Therefore, in the state shown in FIG. 5A, the piezoelectric element applies a force to the eccentric cam 4. More specifically, the eccentric cam 4 and the rotation shaft 2 receive a force applied from the piezoelectric element 8a, and the force acts on the center p of the eccentric cam 4 as a force of a vector $l_1$. When the force of the vector $l_1$ acts, the inner ring $6_1$ of the outer cylinder 6 and the inner cylinder 5 of the eccentric cam 4 and the rotation shaft 2 begin to rotate at the same time. When the inner cylinder 5 of the eccentric cam 4 is rotated and the position of the mark ✰ is shifted from the Y-axis, a voltage is gradually applied to the piezoelectric elements 8b and 8d, and the elements 8b and 8d are deformed. Thus, the force of the piezoelectric element 8b begins to be applied to the eccentric cam 4. On the other hand, the force applied from the piezoelectric element 8a to the eccentric cam 4 is gradually weakened. Forces applied from the piezoelectric elements 8a and 8b to the eccentric cam 4 at an instance when the inner cylinder 5 of the eccentric cam 4 is rotated through 45° are substantially equal to each other, and the synthesized vector $l_2$ thereof acts on the center 0 of the eccentric cam 4, thereby accelerating the rotation shaft 2.

At this time, although the rotation shaft 2, and the inner cylinder 5 and the inner ring $6_1$ of the outer cylinder 6 of the eccentric cam 4 are rotated through 45°, the inner ring $6_1$ and the outer ring $6_2$ are not interlocked with each other because of the presence of the ball bearings 7. Since the rolling resistance of the ball bearings 7 is smaller than a frictional resistance between the outer periphery of the outer ring $6_2$ and the piezoelectric elements, the outer ring $6_2$ is not rotated but is moved by a distance corresponding to the deformation of the piezoelectric elements. When the eccentric direction of the inner cylinder 5 of the eccentric cam 4 indicated by the mark ✰ coincides with the X-axis, as shown in FIG. 5C, a force acting on the eccentric cam 4 is only a force by the piezoelectric element 8b. The remaining piezoelectric elements 8a, 8c, and 8d are deformed at positions serving as brakes to prevent overrunning. At this time, the force from the piezoelectric element 8b acts on the inner cylinder 5 of the eccentric cam 4 as a vector $l_3$. The inner cylinder 5 of the eccentric cam 4 is further rotated by the force of the piezoelectric element 8b. When the eccentric direction indicated by the mark ✰ of the inner cylinder 5 is shifted from the X-axis, the force of the piezoelectric element 8c acts on the eccentric cam 4, as shown in FIG. 5D. The forces of the piezoelectric elements 8b and 8c simultaneously act on the inner cylinder 5 of the eccentric cam 4 as a synthesized vector $l_4$, thereby further rotating the inner cylinder 5.

In this manner, the synthesized vector in a rotation direction is generated by combining forces by deformation of the piezoelectric elements 8a, 8b, 8c, and 8d in accordance with the eccentric position indicated by the mark ✰ of the inner cylinder 5 of the eccentric cam 4, and acts on the inner cylinder 5 of the eccentric cam 4, thereby rotating it as shown in FIGS. 5E and 5F.

The outer cylinder $6_1$ of the eccentric cam 4 does not rotate on its axis due to a difference in resistances, as described above, but such that the mark O revolves around an axis of a broken circle in FIG. 5F.

When the rotation speed is to be changed during the rotation operation described above, a rate of change in voltages applied to the piezoelectric elements 8a, 8b, 8c, and 8d is changed to control the rotation speed. When the rotation direction is to be reversed, a voltage is applied so that the opposing piezoelectric elements are deformed to reverse the directions of the vectors in FIGS. 5A to 5F, thereby allowing reverse rotation. When the rotation is to be stopped, a change in voltages applied to the piezoelectric elements can be stopped.

When the rotation is to be locked, the maximum voltages can be applied to all the piezoelectric elements 8a, 8b, 8c, and 8d.

When a free rotation state is to be achieved, all the piezoelectric elements 8a, 8b, 8c, and 8d are deformed to be separated from the eccentric cam 4. Thus, the rotation shaft 2 can be freely rotated without a resistance caused by an external force.

A second embodiment of the present invention will now be described with reference to FIGS. 6 to 8.

Figure 6:
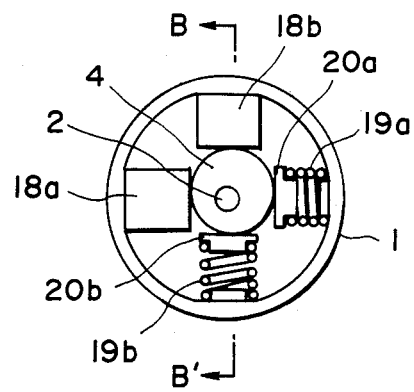
FIG. 6 is a view showing the structure of a rotary actuator according to a second embodiment of the present invention.
Figure 7:
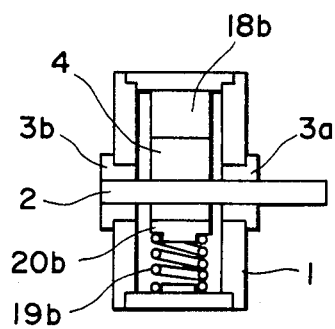
FIG. 7 is a sectional view taken along a line B-B' in FIG. 6.

FIGS. 6 and 7 show a rotary actuator. The same reference numerals in FIGS. 6 and 7 denote the same parts as in FIGS. 1 and 2, and a detailed description thereof will be omitted.

Piezoelectric elements 18a and 18b are fixed to a housing 1 so as to be perpendicular to a rotation shaft 2 and to apply a force to an eccentric cam 4.

Springs 19a and 19b are fixed at one end to the housing 1, such that pressures are applied to the eccentric cam 4 in the opposite direction of the piezoelectric elements 18a and 18b. If the opposing piezoelectric element is extended, the eccentric cam 4 is rotated and the spring contracts while accumulating energy. In contrast to this, if the opposing piezoelectric element contracts, the spring is extended while releasing the accumulated energy through the eccentric cam 4, and at the same time, contributes to the rotation force of the eccentric cam 4.

Members 20a and 20b are adopted to allow a uniform contact between the eccentric cam 4 and the springs 19a and 19b.

Figure 8:
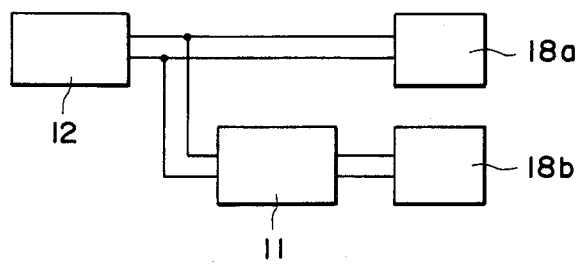
FIG. 8 is a block diagram of the actuator shown in FIG. 6.

A circuit shown in FIG. 8 includes the piezoelectric elements 18a and 18b, and a phase conversion circuit 11 for delaying phase by 90°.

An AC power source circuit 12 shown in FIG. 8 can be a power source circuit for transforming a commercial power source or can be an AC oscillation circuit. That is, the circuit 12 can apply to the piezoelectric elements 18a and 18b a 90° phase-shifted AC voltage with which a deviation twice an eccentricity of the eccentric cam 4 can be obtained by deformation of the elements 18a and 18b. Changes in forces of the piezoelectric element and the springs applied to the eccentric cam 4 and a combination thereof, and a rotation operation thereby are the same as those in the first embodiment. However, the difference between the first and second embodiments is as follows. When the piezoelectric element 18a or 18b is extended, the opposing spring 19a or 19b contracts to accumulate energy. In contrast to this, when the piezoelectric element 18a or 18b contracts, the return pressure of the opposing spring 19a or 19b causes the eccentric cam 4 to rotate.

A third embodiment of the present invention will now be described with reference to FIGS. 9 to 14.

Figure 9:
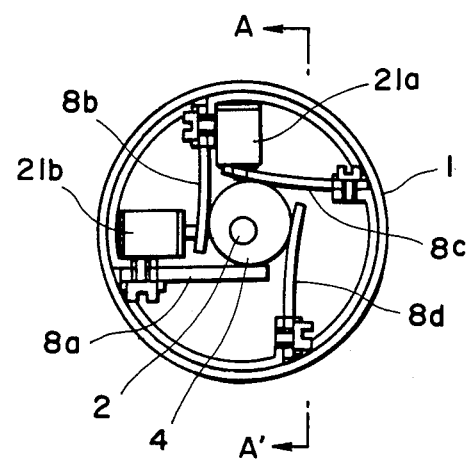
FIG. 9 is a view showing the structure of a rotary actuator according to a third embodiment of the present invention.
Figure 10:
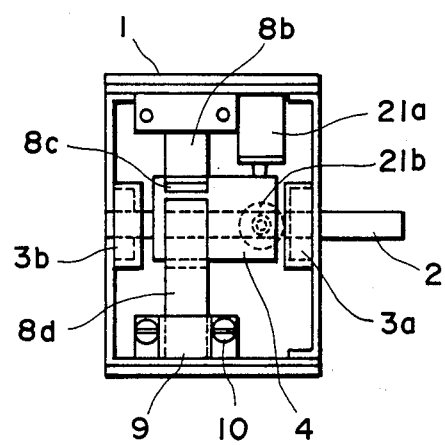
FIG. 10 is a sectional view taken along a line A-A' in FIG. 9.

FIGS. 9 and 10 show a rotary actuator. The same reference numerals in FIGS. 9 and 10 denote the same parts as in FIGS. 1 and 2, and a detailed description thereof will be omitted.

In FIGS. 9 and 10, proximity sensors 21a and 21b measure a proximity amount of the surface of an eccentric cam 4 at two orthogonal positions by utilizing the fact that an inductance changes as the surface of the eccentric cam 4 comes closer, thereby detecting a rotation angle of the eccentric cam 4.

A control circuit for the rotary actuator will be described with reference to FIG. 11.

Figure 11:
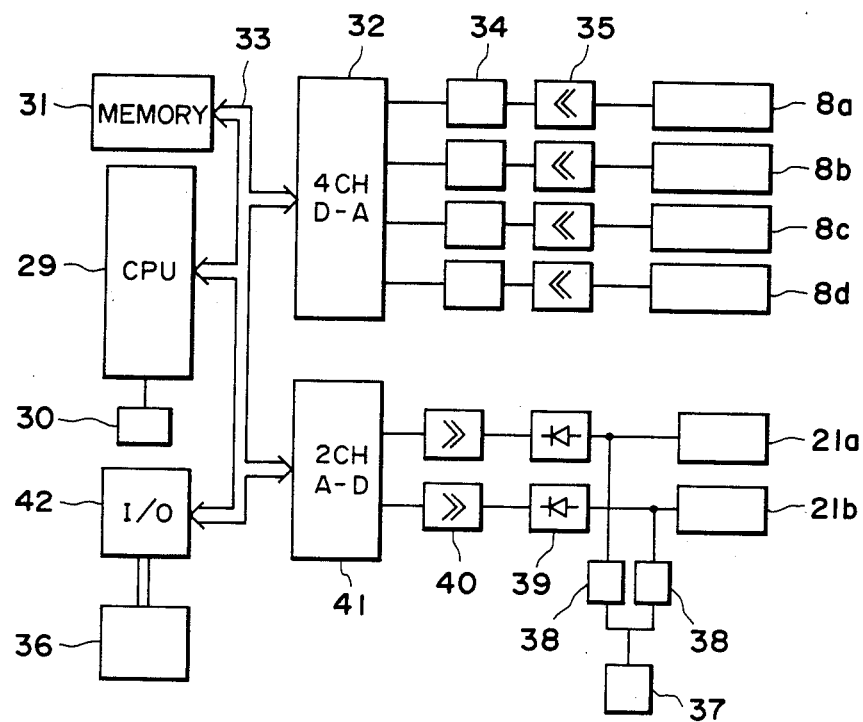
FIG. 11 is a block diagram of the actuator shown in FIG. 9.

The circuit shown in FIG. 11 includes the piezoelectric elements 8a, 8b, 8c, and 8d, and the proximity sensors 21a and 21b shown in FIGS. 9 and 10. The circuit also includes a CPU 29, a clock pulse oscillator 30, a memory 31 having a ROM and a RAM, and a 4-channel D-A converter 32. A bus line 33 is connected to the CPU 29, the memory 31, the D-A converter 32, an A-D converter 41, and an I/O circuit 42. Smoothing circuits $34_1$, $34_2$, $34_3$, and $34_4$ connected to the D-A converter 32 are adopted to smooth the D-A converted voltages. Amplifiers $35_1$, $35_2$, $35_3$, $35_4$ connected to the corresponding smoothing circuits amplify the smoothed voltages, and supply the amplified voltages to the piezoelectric elements 8a, 8b, 8c, and 8d, respectively. A connector 36 connected to the I/O circuit 42 is adopted for connection with a keyboard or other control circuits. A constant-voltage, high-frequency oscillator 37 is connected to resistors 38. A pair of detectors 39 are connected to the corresponding one of a pair of amplifiers 40. The amplifiers 40 are connected to the A-D converter 41. A constant, high-frequency voltage is individually applied to the sensors 21a and 21b through the resistors 38. Therefore, if the inductances of the sensors 21a and 21b change, voltages across the sensors 21a and 21b are changed. A change in voltage is extracted by the detectors 39, and is amplified by the amplifiers 40. The amplified component is then converted to a digital signal by the A-D converter 41, and is then input to the CPU 29.

The I/O circuit 42 is adopted to input a key input or an input signal from another control circuit to the CPU 29.

The operation of the above arrangement will now be described with reference to the flow charts shown in FIGS. 12, 13, and 14.

When a power source switch (not shown) is turned on, the flow advances to step S1, and the CPU 29 and the entire circuit are reset. The following operation is executed in accordance with a program stored in the ROM of the memory 31. A WAIT time W during which the rotation speed is controlled is set to be a standard speed value, and a value U for determining the rotation direction is set to be a value of a standard direction (+1 or −1).

Then, the flow advances to step S2, the CPU 29 receives an input from the I/O circuit 42, and the flow advances to step S3. If there is no input, the flow returns to step S2. Thus, this loop is repeated to wait for an input. If there is an input, the flow enters a subprogram 1 in step S4.

Figure 13:
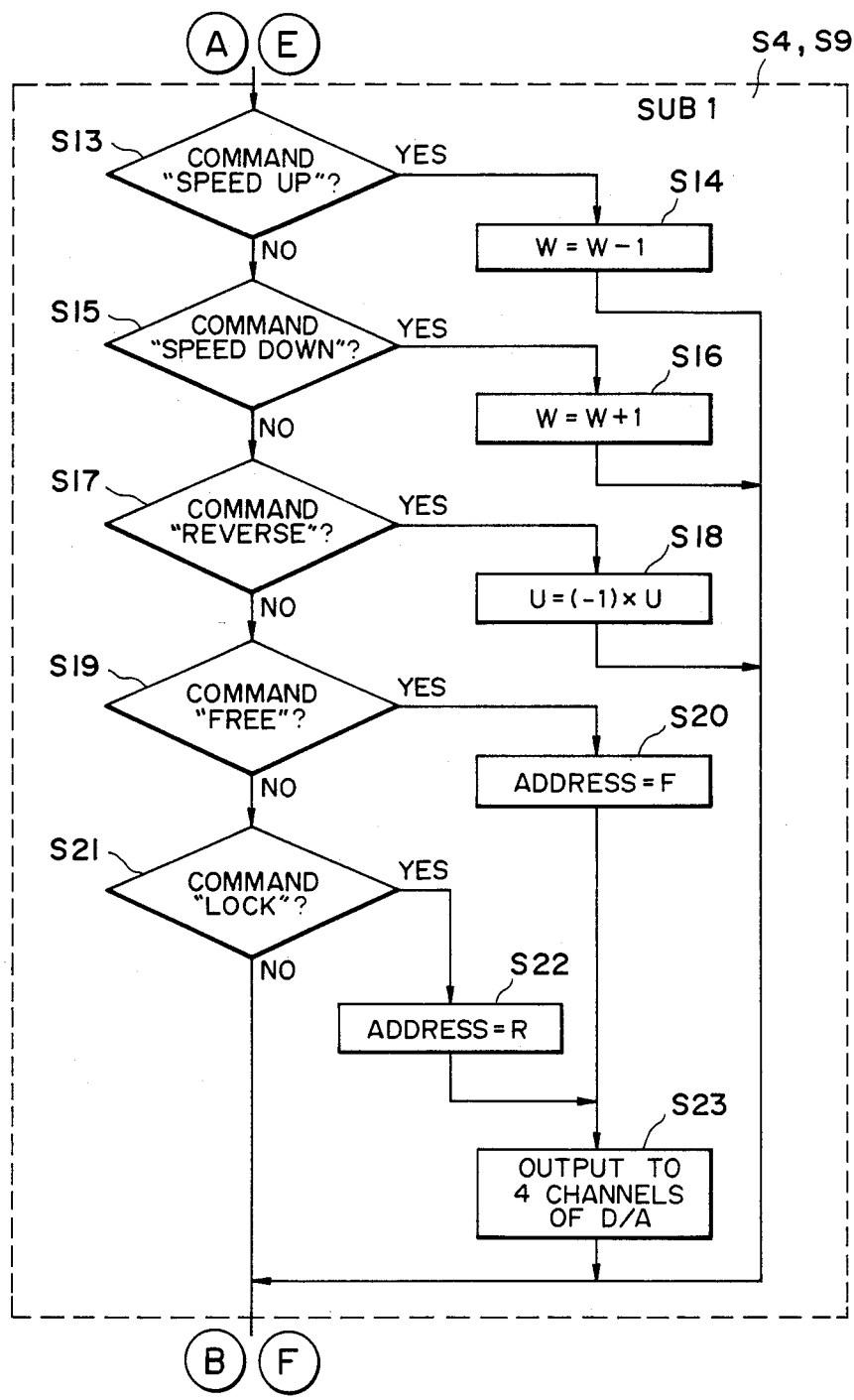
FIG. 13 is a detailed flow chart of SUB1 shown in FIG. 12.

In the subprogram 1 in step S4 shown in FIG. 13, if it is determined in step S13 that the input corresponds to a "speed up" command, the flow advances to step S14; otherwise, the flow advances to step S15.

In step S14, "1" is subtracted from the WAIT time W. That is, the wait time in step S13 is shortened to increase the progress speed of the program, thereby promoting a change in voltage. As a result, the rotation speed can be increased.

Thereafter, the flow advances from the subprogram 1 to connector (B) or (F). If it is determined in step S15 that the input corresponds to a "speed down" command, the flow advances to step S16; otherwise, the flow advances to step S17.

In step S16, "1" is added to the WAIT time W to prolong the wait time, thereby preparing for a decrease in rotation speed. Then, the flow advances from the subprogram 1 to connector (B) or (F).

If it is determined in step S17 that the input corresponds to "reverse" command, the flow advances to step S18; otherwise, the flow advances to step S19.

In step S18, the sign of the value U for determining the rotation direction is reversed. That is, the value U is multiplied with "−1". Thereafter, the flow advances from the subprogram 1 to connector (B) or (F).

If it is determined in step S19 that the input corresponds to a "free" command, the flow advances to step S20; otherwise, the flow advances to step S21.

In step S20, an address is set to be F so as to read out from the memory 31 voltage data for deforming all the piezoelectric elements 8a, 8b, 8c, and 8d to be separated from the eccentric cam 4, and then, the flow advances to step S23.

If it is determined in step S21 that the input corresponds to a "lock" command, the flow advances to step S22; otherwise, the flow advances from the subprogram 1 to connector (B) or (F).

In step S22, an address is set to be R so as to read out from the memory 31 voltage data for deforming the piezoelectric elements 8a, 8b, 8c, and 8d to apply a maximum force to the eccentric cam 4, and then, the flow advances to step S23.

In step S23, the voltage data is read out from a memory area at the address designated in the preceding step, and is output to the four channels of the D-A converter to be supplied to the respective piezoelectric elements. Then, the flow advances from the subprogram 1 to connector (B) or (F).

Figure 12:
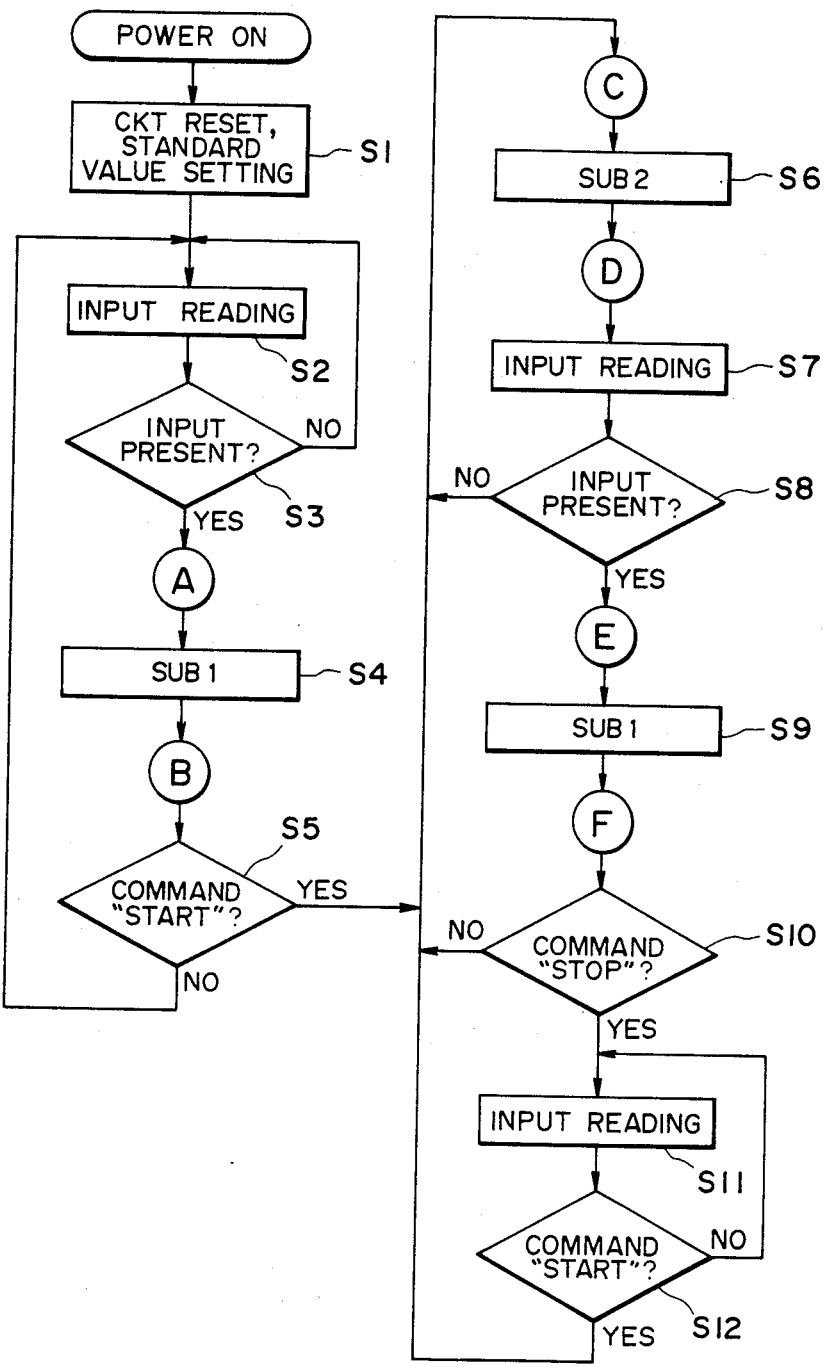
FIG. 12 is a flow chart for explaining the operation sequences of the circuit shown in FIG. 11.

From connector (B) in FIG. 12, if it is determined in step S5 that the command input in step S2 is a "start" command, the flow advances to connector (C); otherwise, the flow returns to step S2 to wait again for an input.

Figure 14:
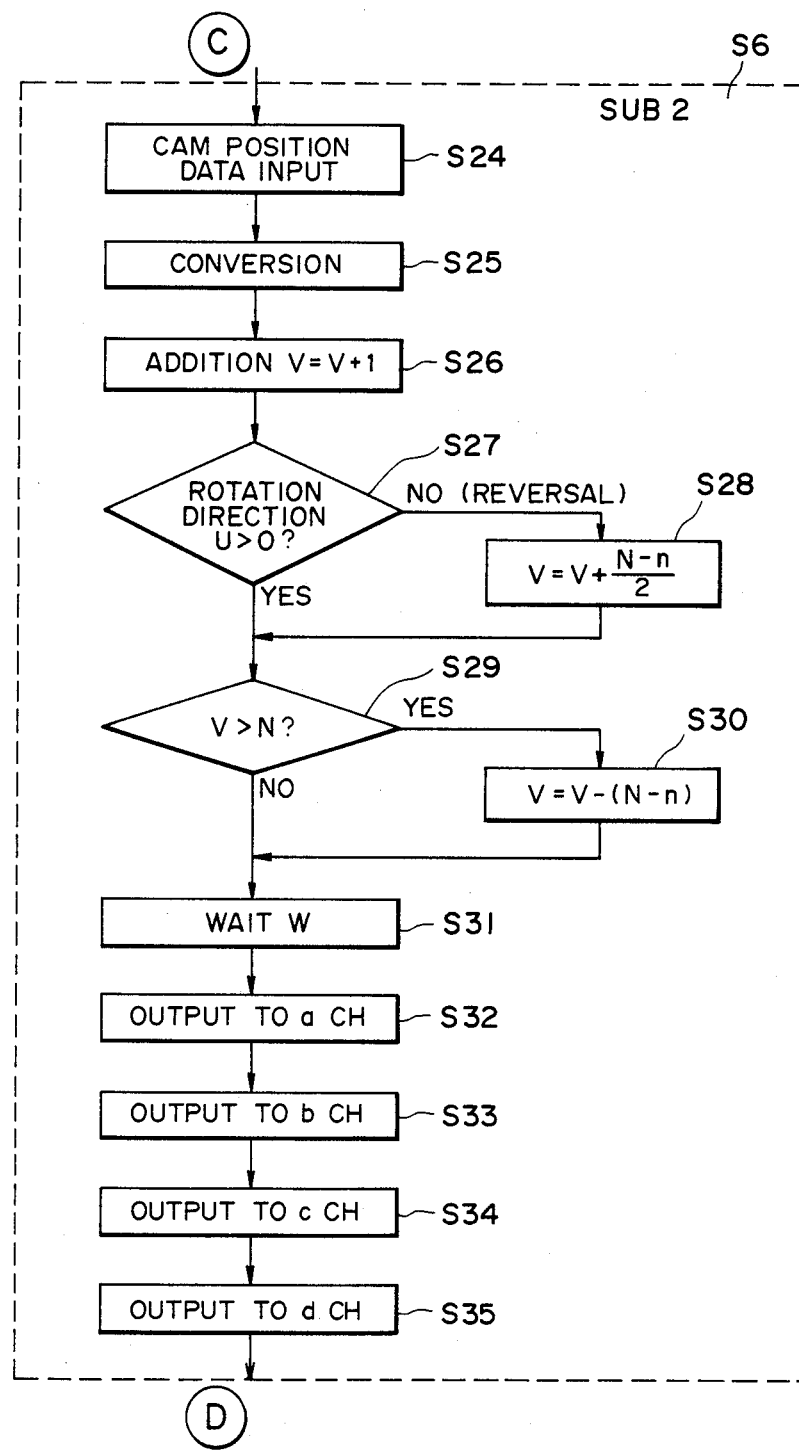
FIG. 14 is a detailed flow chart of SUB2 shown in FIG. 12.

In step S6 as a subprogram 2 shown in FIG. 14, in step S24, voltages corresponding to distances (x and y) between thh cam surface regions along the -X- and the Y-axes and the center of the rotation shaft are input from the sensors 21a and 21b to the CPU 29 through the A-D converter 41. In step S25, the input values are converted to the rotation angle of the eccentric cam 4.

If the distances between the cam surface regions along the -X- and Y-axes and the center of the rotation shaft are given as x and y, a radius of the cam is given as r, a deviation is given as D, an angle defined by the -X-axis and the eccentric direction is given as $\theta_2$, and an angle defined by the Y-axis and the eccentric direction is given as $\theta_1$ (where the angle in the clockwise direction is +), the angles can be expressed as follows:

$$\theta_1 = \cos^{-1}\{(y^2 - r^2 + 2D^2)/2Dy\} \quad (1)$$

$$\theta_2 = \sin^{-1}\{(x^2 - r^2 + 2D^2)/2Dx\} \quad (2)$$

Therefore, the values x and y input in step S24 are substituted in equations (1) and (2).

If the calculation result is $\theta_2 \geq 0$, $\theta = \theta_1 + 90°$. If the calculation result is $\theta_2 < 0$, $\theta = 270° - \theta_1$. Thus, a new angle $\theta$ defined by the -X-axis and the eccentric direction is determined.

The value of the angle $\theta$ is assigned with value "n" to value "N" obtained by dividing 360° by (N−1), and the result is given as V. Note that for N and n, a value corresponding to a voltage to be applied to the piezoelectric element 8a at each angle is stored in the ROM of the memory 31. The address V at which first data is stored corresponds to value n, and the address V at which the last data is stored corresponds to value N. The data stored at the address V=n is a value corresponding to a voltage to be applied to the piezoelectric element 8a when $\theta = 0°$. Data is stored at the address V=(N−n)/4 when $\theta = 90°$. Data is stored at the address V=(N−n)/2 when $\theta = 180°$. Data is stored at the address V=3(N−n)/4 when $\theta = 270°$. At the address V=N, data immediately before 360° is stored. As described above, (N−n) voltage data for one rotation are stored in the ROM of the memory 31.

Since the voltage-deformation characteristics of the piezoelectric elements are not linear and have hysteresis, the storage data are compensated and are stored in the ROM.

When a non-linear angular speed is to be obtained, a value with which a change in voltage corresponds to speeds for each angle i.e., a value for increasing a change in voltage in order to increase a speed and for decreasing a change in voltage in order to decrease a speed, is stored in the memory 31.

In step S26, "1" is added to V to obtain a new value V. When the sensors are not used, the subprogram 2 in step S6 starts from step S26. Upon starting, steps S24 and S25 are executed, and thereafter, the subprogram 2 in step S6 may be repeated from step S26. If it is determined in step S27 that U is a positive value, the flow advances to step S29; otherwise, the flow advances to step S28. In step S28, "(N−n)/2" is added to V to obtain a new value V. This means that the address V is advanced by (N−n)/2 (i.e., at an angle of 180°). That is, the data is fetched for reverse rotation.

If it is determined in step S29 that V>N, the flow advances to step S30, and if V<N, the flow advances to step S31. In step S30, (N−n) is subtracted from V to obtain a new value V, and the flow then advances to step S31. This is because N+1 (360°) is equal to n (0°). In step S31, progress of the program is interrupted for the time W to adjust the change rate of a voltage applied to the piezoelectric elements, thereby controlling the rotation speed.

In step S32, data at the address V is read, and is D-A converted. The converted data is output to an a channel (CH), and a voltage is applied to the pizeoelectric element 8a. In step S33, data at the address (V−(N−n)/4) is read. However, if this value is smaller than n, it is added to (N−n), and voltage data is read out from the address corresponding to the sum. The readout data is D-A converted, and is output to a b channel. Thus, a voltage is applied to the piezoelectric element 8b.

More specifically, a voltage having a phase delayed from that applied to the piezoelectric element 8a by 90° is output to the b channel (i.e., piezoelectric element 8b).

In step S34, data at the address (V−(N−n)/2) is read. However, if this value is smaller than n, it is added to (N−n), and voltage data is read out from the address corresponding to the sum. The readout data is D-A converted, and is output to a c channel. Thus, a voltage is applied to the piezoelectric element 8c.

More specifically, a voltage delayed from the a channel by 180° is output to the c channel.

In step S35, data at address (V−3(N−n)/4) is read. However, if this value is smaller than n, it is added to (N−n), and voltage data is read out from the address corresponding to the sum. The readout data is D-A converted, and is output to a d channel. Thus, a voltage is applied to the piezoelectric element 8d.

More specifically, a voltage delayed from the a channel by 270° is output to the d channel.

The subprogram 2 in step S6 is ended, and the flow advances to connector (D) in FIG. 12.

In step S7, an input is read, and the flow advances to step S8.

In step S8, if there is no input, the flow advances to connector (C), and the flow enters the subprogram 2 in step S6 so as to repeat the drive operation. If an input is detected, the flow enters the subprogram 1 in step S9.

After the subprogram 1 in step S9 is ended, if it is determined in step S10 that the input in step S7 does not correspond to a "stop" command, the flow advances to connector (C) to enter the subprogram 2 in step S6. Thus, the drive operation is continued. If the input corresponds to the "stop" command, the flow advances to step S11, and an input is read. If it is determined in step S12 that the input content does not correspond to the "start" command, the flow returns to step S11. This loop is repeated until the "start" command is input. Therefore, since the subprogram 2 is not executed, a voltage is not changed, and the cam is kept stopped.

If the "start" command is detected in step S11, the flow advances from step S12 to connector (C) and enters the subprogram 2 in step S6, thereby initiating the drive operation.

This concludes the description of the operation sequences with reference to the flow charts. When only the piezoelectric elements are used, steps S34 and S35 can be omitted, and other operations are substantially the same as those described above.

According to the present invention as described above, the rotary member is eccentrically arranged, a plurality of electromechanical conversion elements are arranged at equal angular intervals, and the electromechanical conversion elements are driven to rotate the rotary member. The rotary motion can provide non-inertial motion. Therefore, non-linear angular speed motion can also be achieved.

Furthermore, a mechanism such as reduction gears can be omitted, and a drive source can be incorporated in the machine. Therefore, a simple, compact, lightweight, low-cost rotary actuator can be obtained.

Furthermore, the rotary actuator can be operated with low power consumption without causing adverse influences such as noise or vibration.

What I claim is:

1. A rotary actuator comprising:

a rotary member having an outer cylinder, an inner cylinder rotated by the rotation of said outer cylinder, and a rotary shaft eccentrically fixed to said inner cylinder, wherein a rotary angle of said inner cylinder being equal to a rotary angle of said outer cylinder, said rotary shaft being rotated by the rotation of said outer cylinder due to the eccentricity of said rotary shaft relative to said inner cylinder;

a plurality of electro-mechanical conversion members arranged around said rotary member at equal angular intervals, said plurality of electro-mechanical conversion members being shifted to successively exert a force against said outer cylinder, thereby causing said outer cylinder to revolve; and drive means for driving said plurality of electro-mechanical conversion members, whereby said drive means drives at least one of said plurality of electro-mechanical conversion members to exert a force against said rotary member.

2. An actuator according to claim 1, wherein said electromechanical conversion members are piezoelectric elements.

3. An actuator according to claim 1, wherein said drive control means sequentially supplies AC voltages having different phases to said plurality of electromechanical conversion members.

4. An actuator according to claim 1, wherein said outer cylinder of said rotary member comprises an inner ring and an outer ring which are arranged through ball bearings, said inner ring being fixed to said inner cylinder.

5. An actuator according to claim 1, further including:

a plurality of biasing members arranged around said rotary member at equal angular intervals, each of said biasing members opposing the corresponding one of said electromechanical conversion members through said rotary member, and said biasing members being operated in response to a deviation of the opposing electromechanical conversion member.

6. A rotary actuator comprising:

a rotary member having an outer cylinder, an inner cylinder rotated by the rotation of said outer cylinder, and a rotary shaft eccentrically fixed to said inner cylinder, wherein a rotary angle of said inner cylinder being equal to a rotary angle of said outer cylinder, said rotary shaft being rotated by the rotation of said outer cylinder due to the eccentricity of said rotary shaft relative to said inner cylinder;

a plurality of electro-mechanical conversion members arranged around said rotary member at equal angular intervals, said plurality of electro-mechanical conversion members being shifted to successively exert a force against said outer cylinder, thereby causing said outer cylinder to revolve;

drive means for driving said plurality of electro-mechanical conversion members, whereby said drive means drives at least one of said plurality of electro-mechanical conversion members to exert a force against said rotary member; and control means for controlling said drive means, whereby said control means having a sensor for detecting a rotary angle of said rotary member, and causing said drive means to control an eccentricity of said electro-mechanical conversion member, based on the detection results of said sensor.

* * * * *

UNITED STATES PATENT AND TRADEMARK OFFICE
CERTIFICATE OF CORRECTION

PATENT NO.   : 4,782,262
DATED        : November 1, 1988
INVENTOR(S)  : Hiroshi Kiyo-Oka It is certified that error appears in the above-identified patent and that said Letters Patent is hereby corrected as shown below:

COLUMN 1

Line 30, "genreated" should read --generated--.

Line 50, "electrochemical" should read --electromechanical--.

COLUMN 3

Line 1, "eccemtric cam 4," should read --eccentric cam 4,--.

Line 8, "form" should read --from--.

COLUMN 6

Line 58, "thh" should read --the--.

COLUMN 7

Line 64, "pizeoelectric" should read --piezoelectric--.

Signed and Sealed this

Fourth Day of July, 1989

Attest:

DONALD J. QUIGG

*Attesting Officer*       *Commissioner of Patents and Trademarks*